United States Patent [19]

Sigurdsson

[11] Patent Number: 5,033,410
[45] Date of Patent: Jul. 23, 1991

[54] CHEWING OBJECT FOR ANIMALS HAVING BRISTLE STRUCTURE

[75] Inventor: Einar H. Sigurdsson, Carmel, Calif.

[73] Assignee: Toothbrush Bone, Inc., San Francisco, Calif.

[21] Appl. No.: 513,248

[22] Filed: Apr. 24, 1990

[51] Int. Cl.⁵ .............................................. A01K 15/00
[52] U.S. Cl. ................................................. 119/29.5
[58] Field of Search ............... 119/29, 29.5; 273/58 R, 273/58 A, 58 K

[56] References Cited

U.S. PATENT DOCUMENTS

| | | | |
|---|---|---|---|
| 1,149,170 | 8/1915 | Allis | 119/29.5 |
| 1,548,531 | 8/1925 | Knight | 273/58 A |
| 2,509,087 | 5/1950 | Edmund | 273/58 R |
| 2,988,045 | 6/1961 | Fisher | 119/29 |
| 3,104,648 | 9/1963 | Fisher | 119/29 |
| 3,123,047 | 3/1964 | Fisher | 119/29.5 |
| 3,651,530 | 3/1972 | Schultz | 273/58 K |
| 3,759,518 | 9/1973 | Moroz | 273/58 A |
| 3,871,334 | 3/1975 | Axelrod | 119/29.5 |
| 4,513,014 | 4/1985 | Edward | 119/29.5 |
| 4,674,444 | 6/1987 | Axelrod | 119/29.5 |
| 4,738,001 | 4/1988 | Shipp | 15/106 |
| 4,756,529 | 7/1988 | Stillinger | 273/58 K |
| 4,770,123 | 9/1988 | Bell | 119/29 |
| 4,771,733 | 9/1988 | Axelrod | 119/29.5 |
| 4,802,444 | 2/1989 | Markham et al. | 119/29 |

*Primary Examiner*—Paul J. Hirsch
*Attorney, Agent, or Firm*—Townsend and Townsend

[57] ABSTRACT

Rope woven from semirigid, breakable and elastically deformed synthetic fibers, such as polyethylene fibers, is broken into discrete segments. The rope is woven with portions of the individual fiber's surface exposed and remaining portions of the same surface-exposed fibers embedded within the mass of the rope. The rope is impregnated with a flavored media having a taste desirable to animals. For example, a braided or woven polyethylene fiber rope having individual strands on the order of one eighth of an inch or less is boiled in equal parts of a flavoring media and water for a period of about three hours. Exemplary flavoring can include cod liver oil alone for cats and a combination of cod liver oil and beef broth for dogs. The rope segment can optionally be tied with knots at the distal ends and sealed at the point of severance, as by searing with heat the severed fiber ends. When given to an animal, chewing naturally occurs with the surface-exposed elastically deformed, semirigid fibers breaking at the impact of the animal's teeth. The broken fibers elastically return to their unrestrained disposition and, as a result, extend away from the remaining mass of the rope protruding in a bristle-like fashion. The ends of the broken fibers embedded in the mass of the rope maintain the broken bristle-like fibers in a protruding array extending away from the remaining mass of the rope segment. Further chewing on the part of the animal causes the animals teeth to pass the broken and protruding elastic, semirigid fiber members with a brushing action not unlike that of a toothbrush. There results a natural cleansing action to the teeth of the animal during consumption of the natural bone product.

9 Claims, 1 Drawing Sheet

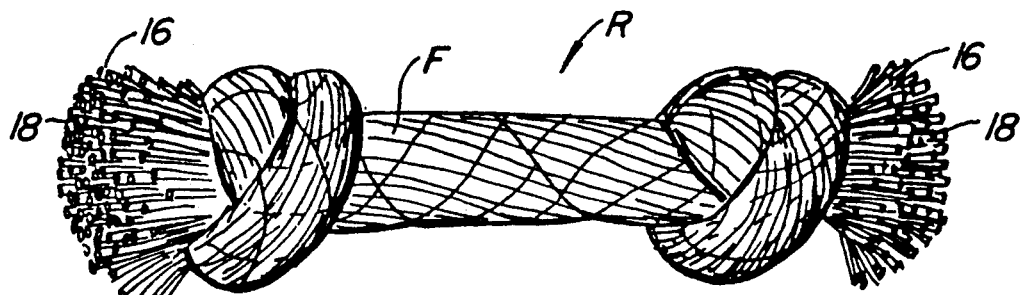
FIG._1.
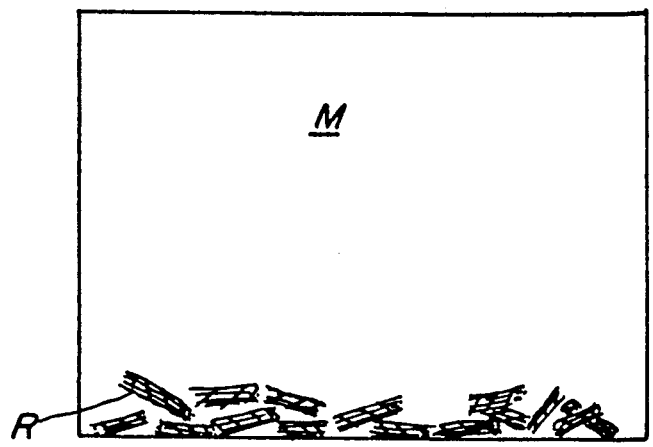
FIG._2.
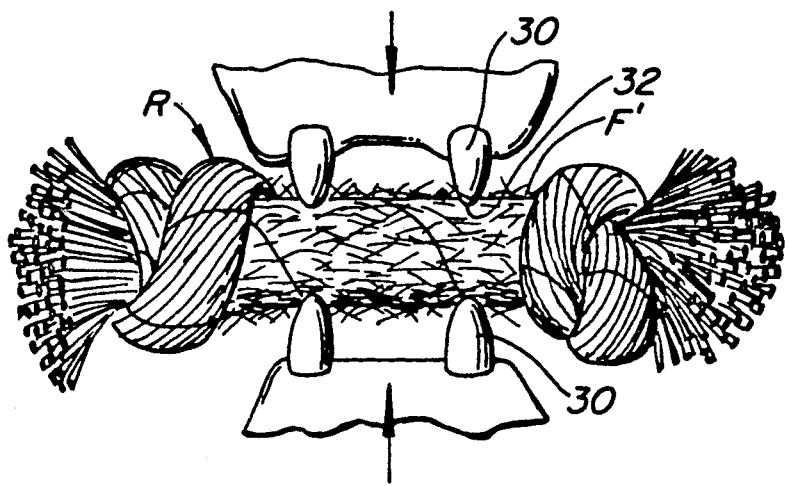
FIG._3.

CHEWING OBJECT FOR ANIMALS HAVING BRISTLE STRUCTURE

BACKGROUND OF THE INVENTION

This invention relates to a synthetic bone product for animals and more particularly to an artificial bone product having a bristle array for scrubbing the teeth of an animal during chewing.

SUMMARY OF THE PRIOR ART

Artificial bones for animals are well known. Of late, various synthetic bones have been substituted for natural bones, these synthetic bones being constructed of nylon and polyethylene. Synthetic bones have been found to be relatively harmless to the animal even when completely consumed. Moreover, such synthetic bones are of relatively long-lasting duration. The presence of such bones typically confines animals to chewing the bones—and not other objects in the home of the pet.

It is known to have canine and feline toothbrushes (see U.S. Pat. No. 4,738,001 to Shipp, issued Apr. 19, 1988 entitled "Canine and Feline Toothbrush").

It is further known to impregnate water-absorbent nylon shaped artificial bones with flavoring to render the bone product attractive for chewing by the animal. Such bones are usually of a solid disposition. (See U.S. Pat. No. 3,871,334 to Axelrod, issued Mar. 18, 1975 entitled "Pet Toy", U.S. Pat. No. 4,674,444 to Axelrod, issued June 23, 1987 and entitled "Chewing Toy for Dogs and Preparation Thereof"; and, U.S. Pat. No. 4,771,733 to Axelrod, issued Sept. 20, 1988 entitled "Chewable Object Having Flavor or Odor Extract Incorporated Therein."

It is further known to provide a surface to an artificial bone defining concavities with protruding edges. The concavities in cooperation with the protruding edges scrub the animal's teeth during chewing of the bone. See U.S. Pat. No. 4,802,444 to Markham, et al., issued Feb. 7, 1989 entitled "Therapeutic Pet Toy." In this article, an elaborate matrix of grooves having protruding edges is preformed within an otherwise solid chewing object so that upon subsequent chewing by the animal a natural tooth-scrubbing action occurs.

It is further known to provide segments of ordinary rope woven of fibers having tensile strength only for animals to chew on. A preferred embodiment of such an ordinary woven rope includes knots tied at the end of the rope segment. When an animal chews upon such fibers, the individual fibers tear. However, the torn fibers do not protrude, as the fibers of such a product have tensile strength only. As distinguished from the present invention, the chewing of the animal does not produce a bristle-like structure.

SUMMARY OF THE INVENTION

Rope woven from semirigid, breakable and elastically deformed synthetic fibers, such as polyethylene fibers, is broken into discrete segments. The rope is woven with portions of the individual fiber's surface-exposed and remaining portions of the same surface exposed fibers embedded within the mass of the rope. The rope is impregnated with a flavored media having a taste desirable to animals. For example, a braided or woven polyethylene fiber rope having individual strands on the order of one-eighth of an inch or less is boiled in equal parts of a flavoring media and water for a period of about three hours. Exemplary flavoring can include cod liver oil alone for cats and a combination of cod liver oil and beef broth for dogs. The rope segment can optionally be tied with knots at the distal ends and sealed at the point of severance, as by searing with heat the severed fiber ends. When given to an animal, chewing naturally occurs with the surface-exposed, elastically deformed, semirigid fibers breaking at the impact of the animals teeth. The broken fibers elastically return to their unrestrained disposition and, as a result, extend away from the remaining mass of the rope protruding in a bristle-like fashion. The ends of the broken fibers embedded in the mass of the rope maintain the broken bristle-like fibers in a protruding array extending away from the remaining mass of the rope segment. Further chewing on the part of the animal causes the animal's teeth to pass the broken and protruding elastic, semirigid fiber members with a brushing action not unlike that of a toothbrush. There results a natural cleansing action to the teeth of the animal during consumption of the natural bone product.

BRIEF DESCRIPTION OF THE DRAWINGS

Other objects, features and advantages of this invention will become more apparent after referring to the following drawings and attached specification in which;

FIG. 1 is a perspective of the bone before impregnation with the flavoring media;

FIG. 2 is a schematic illustrating the impregnation process; and

FIG. 3 is a perspective of an animal initially chewing with the teeth of the animal being shown only, the teeth passing the created bristle structure to enjoy the natural cleaning effect on the way to the chewing of the rest of the bone.

DESCRIPTION OF THE PREFERRED EMBODIMENT

Referring to FIG. 1, the simply created bone structure is illustrated. Specifically, a rope segment R is illustrated. This rope segment having respective knots 16 tied at each end thereof. The rope segment has been severed at the respective ends 18 which ends have been seared to prevent further unraveling of the rope. Typically, in a synthetic fiber rope, such searing can occur by taking a soldering iron to the severed ends of the rope and melting the synthetic fiber to agglomerate the fibers into a mass which will not otherwise propagate unraveling of the rope.

The synthetic fiber makeup of the rope is common but must have certain characteristics to comply with the parameters of this invention. Typically, the individual fibers F of the rope are semirigid and elastic. The fibers are semirigid in that in their elastically unstrained state, they tend to linearly protrude. Furthermore, the fibers F are surface-exposed and breakable. That is to say when the fibers are compressed beyond their elastic and deformation limits, breaking of the fibers occurs.

At the same time, fibers F are woven integrally within either the braid or fiber lay up of the rope. That is to say certain portions of the fibers are surface-exposed. At the same time, these surface-exposed fibers at other portions are embedded well within the body and mass of the rope.

Despite these limitations, the reader will understand that such synthetic ropes are common and can easily be acquired.

Once the synthetic rope segment has been formed, it is impregnated in a medium M, a schematic of which is illustrated at FIG. 2. In FIG. 2, a plurality of rope segments are flavored in a medium M. A preferred mix of the medium M includes 95 percent water and 5 percent cod liver oil. Typically, the media of rope and cod liver oil is boiled for periods exceeding an hour and up to three hours in length. The resultant product has the fiber structure just described. At the same time, the prolonged boiling causes some of the fibers to include agglomerated portions, especially where these fibers are surface-exposed. However, it will be understood that the boiling process does not appreciably interfere with the elastic properties and breakage properties of the individual fibers of the synthetic rope.

Finally, and referring to FIG. 3, rope segment R is shown being chewed by the teeth 30 of an animal. As can be seen, many of the fibers F' have been broken. An explanation of this breakage describes the function of the bone of this invention.

It will be remembered that the synthetic rope created of semirigid, breakable, elastic fibers has the individual fibers elastically deformed into the lay or braid of the produced rope. The individual fibers are woven to the rope so that at portions of the rope the fibers are surface-exposed and at remaining portions of the rope the same fibers are embedded into the interior mass of the rope.

It can been seen that an animal chewing upon such fibers produces local points of high stress at points of tooth impact 32. Such chewing strains the individual fibers beyond both their elastic limit and their nonelastic deformation limit with the results that the fibers become broken. They are typically broken at their surface-exposed point of animal tooth impact such as point 32.

When the fibers are broken, their individual ends protrude outwardly from the bone. When sufficient fibers are broken and protrude outwardly, a fiber array of fibers F' is produced around the bone. The fibers occupy a substantially linear disposition and hence form a bristle matrix immediately about the remaining body of the bone.

Further chewing of the animal requires that the teeth of the animal pass the created bristle structure on the way to the chewing of the remainder of the bone. Thus the teeth of the animal, when passing this bristle structure, are individually scrubbed by the severed ends of the bristle structure and naturally cleaned.

It will be understood that an advantage of the disclosed bone is that so long as the entirety of the bone is not consumed by the animal, the bristle structure renews itself. Subsequently, surface-exposed fibers will break and protrude just as the initial fibers break and protrude. The cleaning effect at the bone continues until substantially all of the bone product is consumed.

It will be appreciated that this invention will admit a minor modification. For example, the preferred "bone" like appearance, here illustrated is not required. Simple rope segments seared at their ends without the illustrated knot structure will do as well.

What is claimed is:

1. A chewing object for animals having a natural bristle structure comprising in combination:

a synthetic rope woven from elastically deformed semirigid, breakable fibers, said fibers elastically deformed to conform to the braid of the rope with portions of said fibers exposed to the surface of said rope and remaining portions of said surface-exposed fibers extending interiorly of the mass of said rope;

a flavoring media impregnating said rope and semirigid fibers for encouraging chewing by an animal on said rope at the individual surface-exposed fibers of said rope, whereby chewing of said animal on said fibers breaks said fibers at the point of tooth impact on said fibers and said broken fibers elastically return to an unwoven disposition with respect to said rope with said remaining portions of said surface-exposed fibers extending interiorly of the mass of said rope maintaining said broken semirigid fibers in a bristle array for cleansing the teeth of said animal upon further chewing of said bone.

2. The chewing object of claim 1 and wherein said rope segment is impregnated with cod liver oil.

3. The chewing object of claim 1 and wherein said rope segment is impregnated with cod liver oil and beef broth.

4. The chewing object of claim 1 and including:
    knots defined in the ends of said synthetic rope segment.

5. A process of providing an animal with a bristled chewing object for effecting natural cleansing of the animal's teeth during the chewing process, the process comprising the steps of:

providing a synthetic rope segment having elastic, semirigid, breakable fibers woven to form said rope, said semirigid fibers having portions of said fibers surface exposed and remaining portions of said same fibers embedded within the mass of said rope segment;

impregnating said synthetic rope segment with a flavoring media having a taste encouraging chewing by an animal; and, allowing an animal to chew on said rope segment whereby said rope segment breaks upon impact of said teeth at said surface-exposed fibers and elastically returns to an elastically unstrained disposition with respect to said rope with the remaining portions of said fibers embedded within the mass of said rope maintaining said fibers in a broken protruding array to produce about the rope segment a bristle array for cleansing the tooth structure of said animal upon further chewing.

6. The process of claim 5 and wherein said impregnating step includes impregnating said rope segment with cod liver oil.

7. The process of claim 6 and wherein said impregnating step includes impregnating said rope segment with cod liver oil and beef broth.

8. The process of claim 5 and including before said allowing step the step of:
    tying at least one knot in said rope segment.

9. The process of claim 8 and wherein said tying step includes tying said at least one knot at an end of said rope segment.

* * * * *